US006796489B2

(12) United States Patent
Slater et al.

(10) Patent No.: US 6,796,489 B2
(45) Date of Patent: Sep. 28, 2004

(54) PROCESSING ELECTRONIC DOCUMENTS WITH EMBEDDED DIGITAL SIGNATURES

(75) Inventors: Calvin N. Slater, North Logan, UT (US); Andy L. Rasmussen, Smithfield, UT (US)

(73) Assignee: Ingeo Systems, Inc., Logan, UT (US)

( * ) Notice: Subject to any disclaimer, the term of this patent is extended or adjusted under 35 U.S.C. 154(b) by 65 days.

(21) Appl. No.: 09/875,579

(22) Filed: Jun. 6, 2001

(65) Prior Publication Data

US 2002/0069179 A1 Jun. 6, 2002

Related U.S. Application Data

(60) Provisional application No. 60/210,180, filed on Jun. 6, 2000.

(51) Int. Cl.[7] .............................................. G06F 17/60
(52) U.S. Cl. ...................... 235/379; 235/380; 705/39; 705/44; 713/176; 713/178; 713/180
(58) Field of Search ................................. 235/379, 380, 235/381, 383, 492; 380/51; 705/39, 44, 18; 713/176–180; 703/168, 176, 189

(56) References Cited

U.S. PATENT DOCUMENTS

| | | | | |
|---|---|---|---|---|
| 5,373,550 A | * | 12/1994 | Campbell et al. ...... | 379/100.11 |
| 5,799,086 A | | 8/1998 | Sudia .......................... | 380/23 |
| 5,903,882 A | | 5/1999 | Asay et al. .................... | 705/44 |
| 6,039,248 A | * | 3/2000 | Park et al. ................... | 235/379 |
| 6,044,405 A | * | 3/2000 | Driscoll et al. ............. | 709/232 |
| 6,047,374 A | * | 4/2000 | Barton ........................ | 713/150 |
| 6,170,744 B1 | * | 1/2001 | Lee et al. .................... | 235/380 |
| 6,199,052 B1 | * | 3/2001 | Mitty et al. ................... | 705/75 |
| 6,209,095 B1 | * | 3/2001 | Anderson et al. ........... | 713/176 |
| 6,253,322 B1 | * | 6/2001 | Susaki et al. ............... | 713/170 |
| 6,314,517 B1 | * | 11/2001 | Moses et al. ............... | 713/156 |
| 6,367,013 B1 | * | 4/2002 | Bisbee et al. ............... | 713/178 |
| 6,450,403 B1 | * | 9/2002 | Martens et al. ............. | 235/379 |

* cited by examiner

*Primary Examiner*—Michael G. Lee
*Assistant Examiner*—Ahshik Kim
(74) *Attorney, Agent, or Firm*—Workman Nydegger

(57) ABSTRACT

Systems and methods for processing or recording electronic documents that have embedded digital signatures. In an electronic document, signature blocks are used to embed the digital signatures. When an electronic document is received for recordation, the schema and profile of the document are checked. The electronic document or digital signatures are validated by reconstructing the document to a previous state such that the digital signature may be validated. The electronic document is processed and endorsed by inserting endorsement data. The electronic document is digitally signed by the recorder and a receipt is also digitally signed by the recorder. The electronic document is then imaged and indexed. The recorded electronic document and the receipt are returned to the sender using routing information that was included in the electronic document.

34 Claims, 6 Drawing Sheets

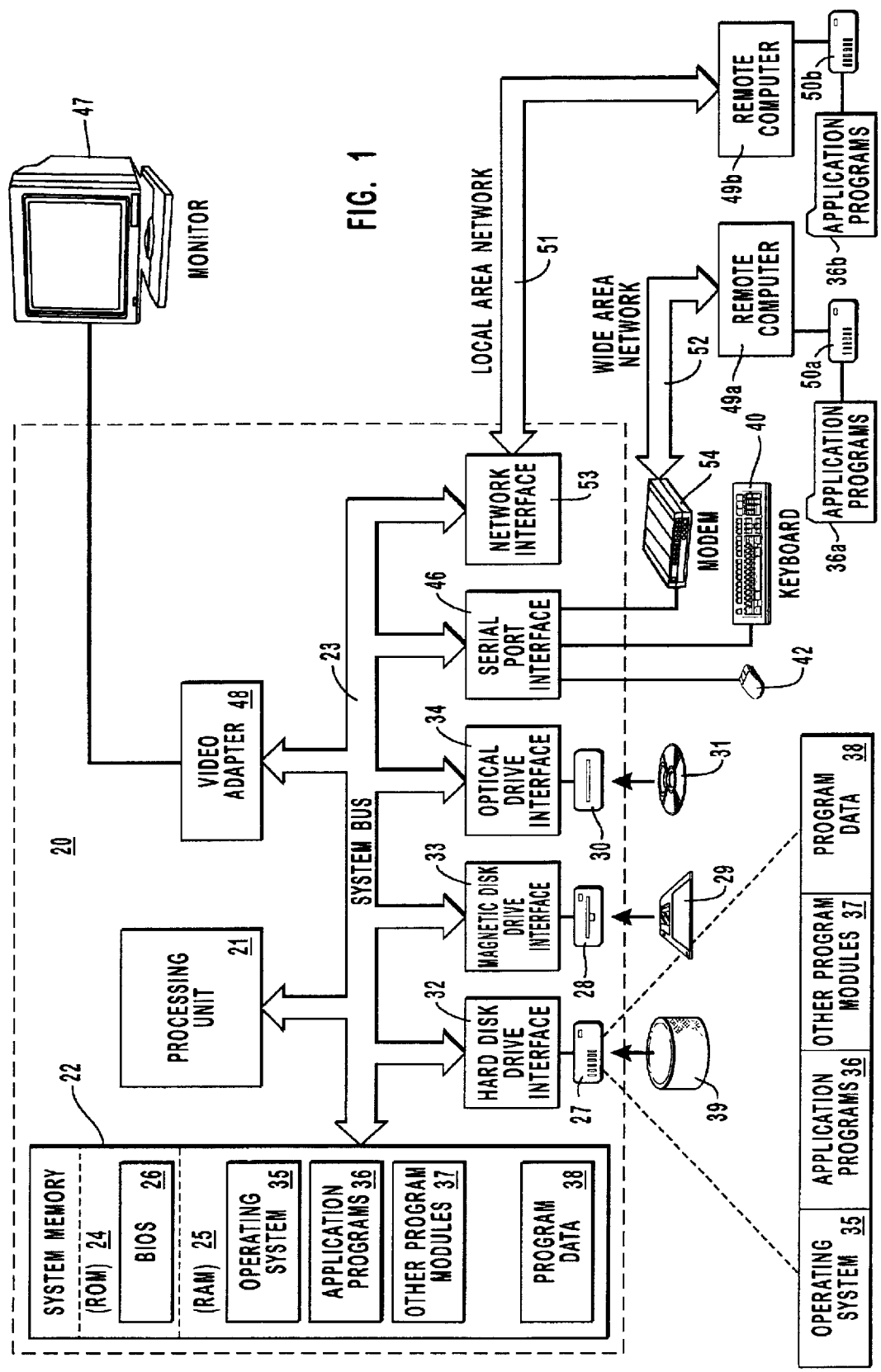

PROCESSING ELECTRONIC DOCUMENTS WITH EMBEDDED DIGITAL SIGNATURES

CROSS-REFERENCE TO RELATED APPLICATIONS

This application claims the benefit of U.S. Provisional Application No. 60/210,180 filed Jun. 6, 2000 and entitled "Electronic Document Processing Apparatus" and is hereby incorporated by reference in its entirety.

BACKGROUND OF THE INVENTION

1. The Field of the Invention

The present invention relates to systems and methods for processing electronic documents. More particularly, the present invention relates to electronic documents having embedded digital signatures and to systems and methods for processing electronic documents such that the embedded digital signatures are validated.

2. Background and Related Art

Signatures are often a formal requirement of various transactions. Many legal instruments, such as wills, contracts, and deeds, are not legally enforceable unless they are signed by the appropriate persons in a specified way. While the specific legal requirements relating to signatures may vary across jurisdictions, the requirement of having a signature on a document serves fundamental purposes. For instance, signatures should be indicative of the person that signed a particular document and signatures should be difficult to reproduce without authorization. Signatures should also identify what is signed such that it is difficult to alter the signed matter without being discovered. Signatures further serve to authenticate a document by identifying each person that signed the document and the act of signing a document is intended to bring the legal aspects of signing the document to the attention of the signer.

The procedures for affixing signatures to paper documents is relatively well established. In the digital realm, however, persons are more reluctant to affix a digital signature to an electronic document for various reasons even though the characteristics of digital signatures (such as authenticity and security) are arguably better than their paper counterparts. For example, persons place more trust in paper signatures in comparison to digital signatures.

When a digital signature is employed to sign a document, the signer first identifies exactly what is being signed. The document or data identified by the signer is hashed to generate a hash result that is essentially unique to the document. Then, the hash result is converted into a digital signature using a private key of the signer to encrypt the hash result. In this manner, both the document and the private key are related to the digital signature.

A significant disadvantage of digital signatures is that they are not an integral part of the document but are attached as a separate file to the document. This creates a significant risk that the digital signature will become disassociated from the document and nullify the effect of the digital signature and results in a document that is not verifiable, especially when the document and the attached digital signature are either stored or transmitted.

Often, documents that are signed with digital signatures are validated or verified. Verifying a digital signature requires that the verifier have access to the public key of the signer in order to decrypt the hash result that was encrypted with the private key of the signer. The difficulty of this proposition is that the public and private key of the signer are not intrinsically associated with the signer. In most cases, a certificate authority (CA) is used to solve this problem. The CA is a trusted third party that issues a digital certificate that states that the signer identified in the digital certificate is the owner of the public key that is the subject of the digital certificate.

Even though the CA provides some assurance that the proper key pair is being employed, digital signatures are still attached as a separate file to the documents that they digitally sign. As previously stated, this weakens the digital signature as an authenticator because the attachment can become separated from the document. This problem can become even more complicated when a document is signed by multiple persons. In this case, subsequent signatures do not incorporate previous signatures because each signature is a separate attachment. The ambiguity and uncertainty surrounding electronic documents is partially responsible for the reluctance to process electronic documents without a paper copy. What is needed are systems and methods that allow electronic documents that are digitally signed to be validated, processed and/or recorded.

SUMMARY OF THE INVENTION

The present invention addresses these and other problems by providing systems and methods for digitally signing and verifying electronic documents by embedding the digital signatures in the electronic document. An extensible markup language (XML) schema is provided and is used to embed digital signatures in the electronic documents. The XML schema provides elements and tags that are used to store each digital signature that will become part of the electronic document. XHTML is used along with the XML schema such that the electronic document can be read and processed by both users and computers.

When an electronic document is created, either from a template or as a new document, a signature block is included for each person that will digitally sign the document. The allotted signature blocks may include notary signature blocks, recorder signature blocks, and other signature blocks as needed. Alternatively, each signature block is generated as necessary and appended to the document as the document is digitally signed. Thus a signature block for a notary is not added to the electronic document until the electronic document has been digitally signed by the primary signers. Similarly, a signature block for the recorder is not added to the electronic document until the electronic document has been digitally signed by the notary.

In one example, the signature block includes a reconstruct attribute that is used when the electronic document is validated or verified. The reconstruct attribute helps to reconstruct the document to a previous state by helping identify information or data that should be removed or stripped from the electronic document. Once the document has been reconstructed, it is hashed to generate a hash value that is compared to a decrypted value of the digital signature of the signer being validated. If these values match, then the digital signature and the document are validated. Because the digital signatures are embedded in the electronic document, they cannot become disassociated from the digital document.

In another example, the signature blocks do not have a reconstruct attribute, but can be reconstructed based in part on the identity of the signer. For example, a notary usually digitally signs an electronic document after the primary signers have digitally signed the document. Thus, reconstructing the document to verify the primary signers requires that the notary signature block and/or digital signature be stripped or removed from the document.

The electronic documents can be processed when they are received by reconstructing the electronic document to a previous state. In the case of electronic documents being recorded, the content of the electronic document as digitally signed by the notary public digital is usually verified. If verification is successful, the recorder is able to insert endorsement data into the digital document and record the electronic document. Finally, the recorder digitally signs the electronic document using a recorder signature block that was already provided in the electronic document and generates a receipt that is also digitally signed by the recorder. In addition, the recorded electronic document and the digitally signed receipt are returned to the originator that is identified in routing information that was included in the electronic document.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates an exemplary system that provides a suitable operating environment for the present invention;

DETAILED DESCRIPTION OF THE INVENTION

Figure 2A:
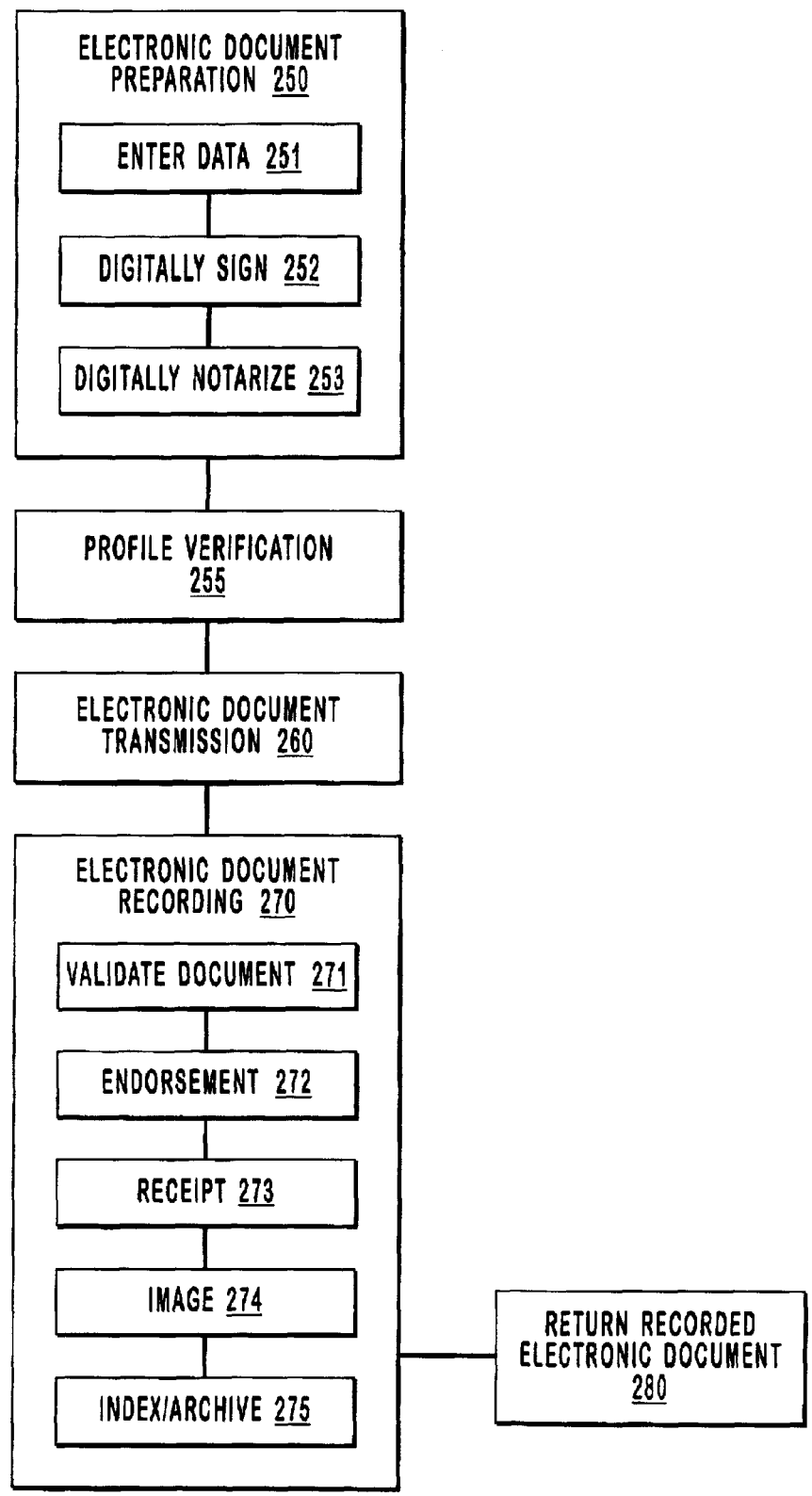
FIG. 2A is a block diagram that illustrates how an electronic document is generated, transmitted, recorded, and returned to a user.

When an electronic document is created but before it is executed or signed, the electronic document typically has only content. The content often expresses the intent of the persons that will sign the document and typically expresses the terms of a transaction. In addition to the content, an unsigned document often has information about the persons that will execute or sign the document. Because many documents do not have effect unless notarized, a typical unsigned electronic document also has a notary block for use by a notary public.

The persons who will digitally sign the electronic document usually examine the document for completeness and then sign the document. After the signers have digitally signed or executed the electronic document, the electronic document is ready to be notarized by the notary public. In many instances, this is enough for the electronic document to have legal effect. However, some transactions, such as land transactions or security interest, need to be recorded and this can only occur after the document is notarized. Once the recorder has authenticated, validated and verified the electronic document, the recorder endorses and records the electronic document.

The present invention thus relates to systems and methods for generating or creating an electronic document that is legally enforceable, machine and human readable and monolithic or non-segmented. The generation or creation of the electronic document often includes the signatures provided by the persons named on the document, the notary, and the recorder. Because these signatures are embedded in the electronic document, each signature can be independently verified and the order in which the signatures were performed can also be determined such that each signature is given the proper effect.

The present invention is described with reference to transactions that are recorded, such as a conveyance and the like, but the present invention can be utilized in other situations and markets. The signature blocks are adapted to the situation. Thus, a recorder signature block may be changed to an approval block for the digital signature of a mortgage company, for example. In other situations, the recorder signature and the notary signature may be omitted. As used herein, a signature block is intended to include notary signature blocks and recorder signature blocks. For example, in the XML schema, a notary signature block may use a <notary signature block> tag instead of a <signature block> tag such that the digital signature of the notary public may be more easily identified in the electronic document. The XML schema employs similar tags for recorders and the like.

The present invention can be employed in government licensing applications such as business licenses, vehicle licenses, hunting and fishing licenses. The present invention can be employed in documents filed with courts, the Securities Exchange Commission, liens, UCC filings, FAA filings, and the like. The present invention can be employed in the context of an electronic courier, in insurance situation when filing claims, real estate transactions, medical records, pharmaceutical applications, and the like. The digital signatures that are required for a particular electronic document is dependent on the transaction, content, or purpose of the electronic document.

The present invention thus extends to both systems and methods for generating and verifying electronic documents. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

FIG. 2A is a block diagram that illustrates the preparation, transmission, and processing of an electronic document that has at least one embedded digital signature. The electronic document is first prepared (250) such that the document may become a binding and legally enforceable document. Preparing the electronic document may include entering data or content into a template (251). Alternatively, a template is not necessary to prepare or create the electronic document and the electronic document can be created without a template.

After the content has been entered, the document is digitally signed (252) by one or more persons who are indicated in or on the electronic document. Signature blocks are usually added to the electronic document for each signer just before they digitally sign the electronic document. Alternatively, signature blocks are often provided in the document for all signers before the electronic document is first signed by the primary signer. In either case, each digital signature is inserted into the appropriate portion of the corresponding signature block when the signer digitally signs the electronic document.

After all of the digital signatures have been obtained and inserted, the electronic document is digitally notarized (253). Digitally notarizing the electronic document is similar to digitally signing the electronic document, except that a notary signature block is used to store the necessary data and signature of the notary public. In some instances, the digital signature of the notary public is not necessary for an electronic document.

After the electronic document is prepared for verification, it undergoes an optional profile verification (255). The profile verification (255) is a module that determines whether recordation of the electronic document will be successful. For example, different counties often have different requirements for recording documents and it is possible to create an electronic document that is valid in one county but not another. The profile verification (255) is aware of validation instructions for various counties or jurisdictions and can usually determine whether the recordation of the electronic document will be successful. In this manner, potential problems can be remedied and rejection notices can be reduced or eliminated. The profile verification (255) can check the structure of the electronic document, the data type, the structure of the package, the data for specific jurisdictions, and the like.

At this point, the digitally signed and notarized electronic document is submitted to and transmitted (260) from an origination server or system to a destination server or system using routing information that is included in the electronic document. The routing information, however, can be provided independent of the electronic document.

Upon arrival at the destination server, the electronic document is processed or, more specifically in this example, recorded (270). Recording an electronic document begins by validating the electronic document (271). Validating the electronic document often includes reconstructing the electronic document to ensure that the document being recorded is the same document that was digitally signed by the signers and digitally signed by the notary public. Next, the recorder gives an endorsement (272) to the electronic document by populating an endorsement section of the electronic document. Endorsing the electronic document also requires that the recorder digitally sign the electronic document. The digital signature of the recorder is similar to the digital signatures of the signers and the notary public, but a recorder signature block is used.

After the electronic document has been endorsed, a receipt (273) is prepared for the electronic document. Next, the electronic document is imaged (274) indexed (275) and archived (275). Finally, the recorded electronic document along with the receipt is returned to the origination server of system (280) that was included in the routing information.

Figure 2B:
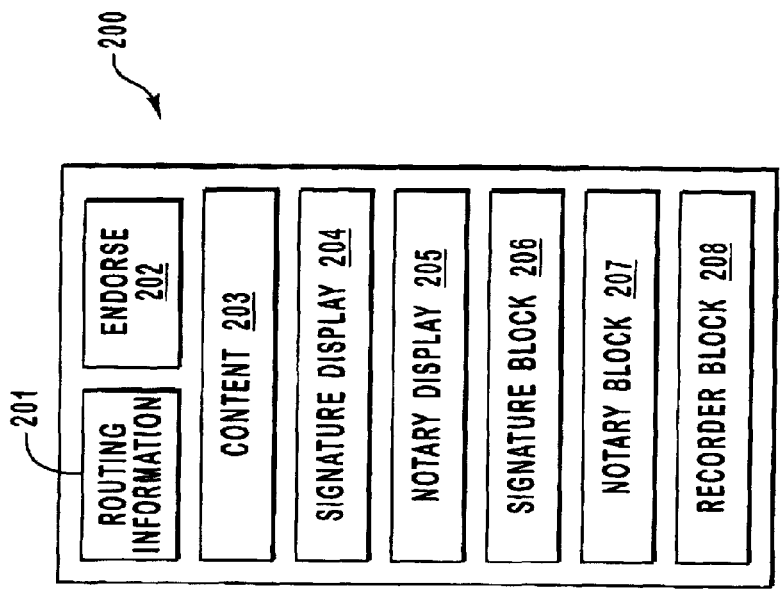
FIG. 2B is a block diagram that illustrates exemplary components of an electronic document that has embedded digital signatures.

FIG. 2B is a block diagram that illustrates an exemplary electronic document 200. The electronic document 200 includes content 203. The content 203 typically relates to the purpose of the electronic document 200 and can be, but is not limited to, a contract between one or more parties, a real estate transaction, a security interest, a loan agreement and the like. The content 203 may also includes all information or data that is necessary for the document to be executed or signed or to have legal effect and may include, but is not limited to, information regarding the persons that will sign the electronic document, notary information, legal content regarding the transaction detailed in the content 203, terms, descriptions, expressions of intent, and the like.

The electronic document 200 passes through various states as it is created or generated. The document is in a signable state when all necessary information or content as described above is present in the electronic document 200. The document is in the notarizable state after the signers have digitally signed or executed the electronic document 200. The document progresses to the recordable state after it is verified that the document contains all necessary information and the digital signatures of the signers and the notary have been verified.

The electronic document 200 also includes routing information 201 and an endorsement 202. The routing information 201 identifies or stores the information that is needed to send and/or receive an electronic document. The routing information 201 may include, for example, an address of a receiving server, document identifiers, and other instructions that may be needed for processing. The routing information 201 may also include, for example, the sender's name, account information used to pay a fee, document and order identification, and an address of the sending server. In this manner, the origin and the destination of the electronic document 200 are known and can be tracked. In some instances, the routing information 201 is not included as part of the electronic document 200. In these situations, the routing information 201 is included in a package that is generated when the electronic document 200 is submitted for recordation.

The endorsement 202 contains, for example, tags or elements that have not been filled or populated. The endorsement 202 is usually reserved for the recorder (or similar entity) to populate upon recording or otherwise processing the electronic document. The endorsement 202 may reference identifying data including, but not limited to, a page, a date and time of recording; a county, a state, a fee, and entry number, a book identifier, a page identifier, the number of pages, the requesting party, the name of the recorder, and the like. The endorsement 202 is adapted to the situation and is in some situations omitted. For instance, some electronic documents are not recorded, but are simply signed. In this instance, the endorsement 202 may be reduced or eliminated.

In another example, the endorsement 202 is simply a placeholder tag that will be used or replaced by a recorder when the electronic document is recorded. In this situation, similar endorsement data will be inserted by the recorder. In both instances, the electronic document is endorsed.

The electronic document 200 also includes a signature display 204 and a notary display 205. Because the document 200 is an electronic document, the signature display 204 is able to display the signature of the signers in human readable form. Similarly, the notary display 205 is able to display the signature of the notary public such that it can be read on a display for example. The signature display 204 is often implemented using a <SignatureDisplay> tag that is initially empty. Upon signing or executing the document, the name of the signer is placed inside the <SignatureDisplay> tag and is often displayed in color. Alternatively, this tag is filled before the electronic document is digitally signed. By displaying the names of the signers and the notary after they have digitally signed the document, a signer can more easily distinguish a signed document from an unsigned document. Similarly, the notary display 205 can also use the <SignatureDisplay> tag such that the name of the notary that notarized the document may be displayed as well. In some instances to be described later, a <SignatureDisplay> tag is not necessary or is dependent on the type of signature block that is employed in the electronic document.

The signature block 206 is used to contain the digital signature of the signer as well as other information. The notary block 207 and the recorder block 208 respectively contain the digital signatures of the notary public and the recorder, although these blocks can be adapted to the capacity of the person or entity signing a particular block. For example, the recorder block 208 may represent the signature of a bank official that authorizes a loan. In some instances, only signature blocks are needed on the electronic document 200 and a notary block and/or a recorder block are not necessary. The required signatures are often dependent on the transaction or content as well as on legal requirements. When a real estate transaction is recorded, both the notary block 207 and the recorder block 208 are usually required, although the required signatures may vary across jurisdictions.

More generally, the electronic document 200 is often implemented as a template where the signature blocks (including the notary signature block and the recorder signature block), the routing information 201, and other data is already present in the template. In this example, these elements only need to be populated by the recorder or other person/entity. This approximates a signature on a paper document, because the user only has to apply their digital signature to the electronic document in this example. In addition, the signature block is already part of the document and is not appended to the document for each signature. For example, when the template is selected, the user may be queried as to the number of signature blocks that are necessary. In this manner, the signature blocks for the persons that ultimately digitally sign the document are already present. Note that the signature blocks include, if necessary, a notary signature block and/or a recorder signature block.

Alternatively, the electronic document 200 can be implemented as a template to which signature blocks are added as needed. Thus, a signature block is added to the electronic document as each signer digitally signs the electronic document.

Figure 3B:
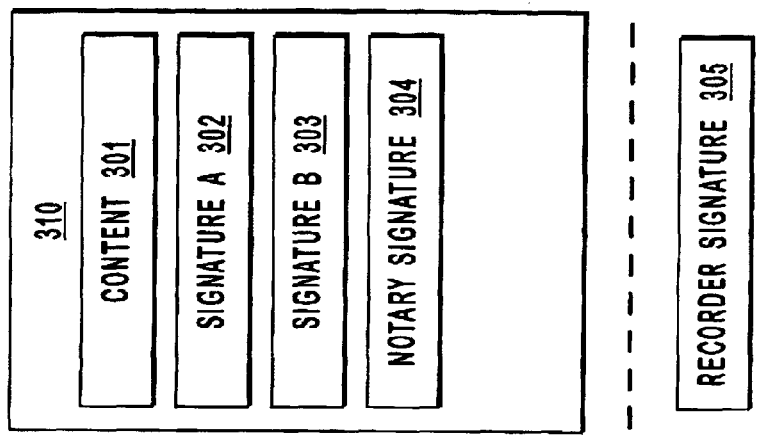
FIG. 3B is a block diagram that illustrates how the signature of the recorder is validated.
Figure 3A:
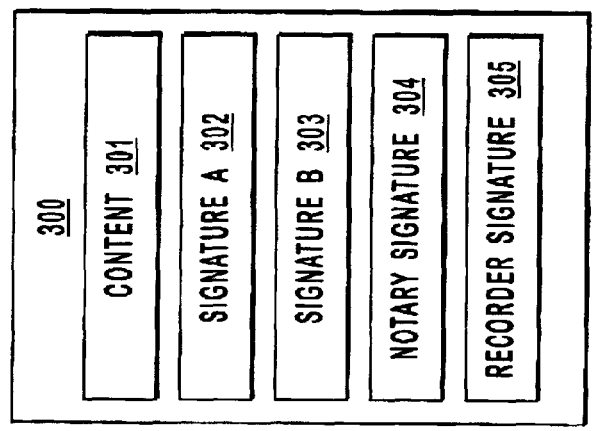
FIG. 3A is a block diagram illustrating an electronic document that has been recorded.

FIGS. 3A, 3B, 3C, 3D, and 3E are block diagrams that illustrate how an electronic document can be both reconstructed, verified, and/or validated. FIGS. 3A through 3E represent different states of the same electronic document, each of which can be reconstructed. FIG. 3A represents a recorded electronic document 300 after the electronic document has been verified and validated. FIG. 3B represents the electronic document 310 before it is recorded and the electronic document 310 has not been digitally signed by the recorder. FIG. 3B also represents a reconstructed document that is used to validate the digital signature of the recorder.

Figure 3E:
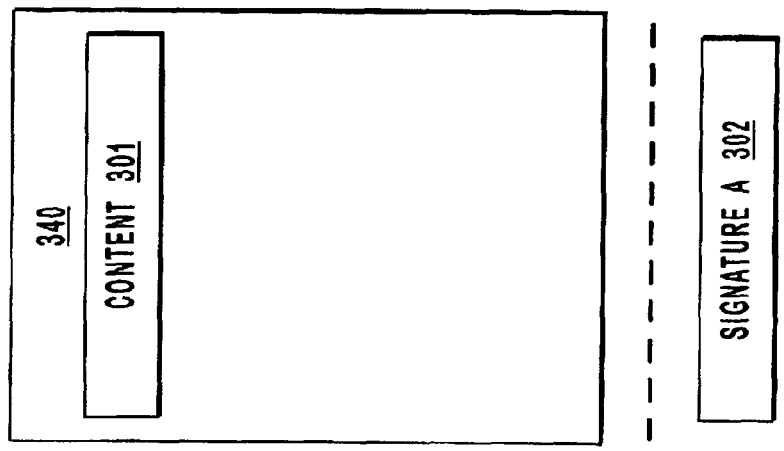
FIG. 3E is a block diagram that illustrates an electronic document that is in a signable state.
Figure 3D:
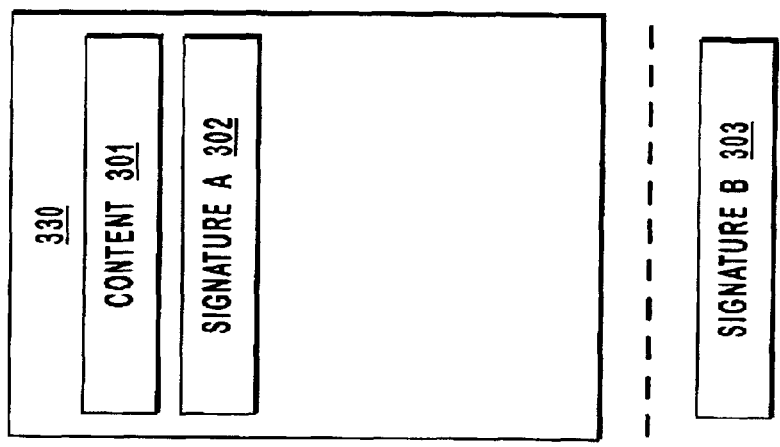
FIG. 3D is a block diagram that illustrates an electronic document that has been reconstructed for verification of a signature.
Figure 3C:
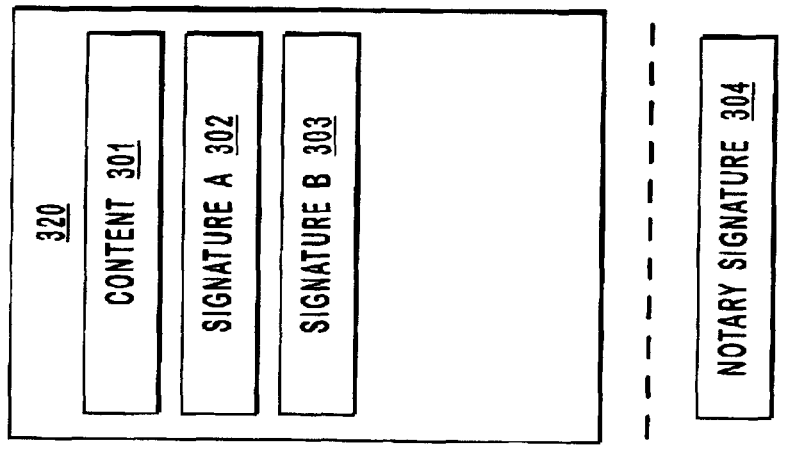
FIG. 3C is a block diagram that illustrates how the signature of the notary public is validated.

FIG. 3C represents the electronic document 320 before it is digitally signed by the notary public and the electronic document 320 does not have a digital notary signature. FIG. 3C also represents a reconstructed electronic document for verifying the digital signature of the notary. FIG. 3D represents an electronic document 330 that has only been signed by the signer A and does not have the digital signature B 331 of signer B. Finally, FIG. 3E represents the electronic document 340 before it is digitally signed by the signer A.

In FIG. 3D, the signature A 302 is embedded. In FIG. 3C, the signature A 302 and the signature B 303 are embedded. In FIG. 3B, the notary signature 304 is embedded in addition to the signature A 302 and the signature B 303. In FIG. 3A all necessary signatures, including the recorder signature 305, are embedded in the electronic document 300.

FIGS. 3A through 3E thus illustrate an electronic document that has been signed in stages. The first or unsigned stage or state of the electronic document is represented by FIG. 3E and the final or fully signed state or stage of the document is represented by FIG. 3A. Any of the document stages represented by FIGS. 3A through 3E can be reconstructed from a later stage. For example, the electronic document 330 of FIG. 3D can be reconstructed from the electronic document 320 of FIG. 3C.

Reconstructing an electronic document ensures that the electronic document has not been changed or altered and is also used when a digital signature is validated. For example, if a first signer digitally signs a document and emails that document to a second signer, the second signer desires some assurance that they are executing the same document executed by the first signer. This can be accomplished by reconstructing the electronic document to its previous state in this example.

In addition, each signer often desires a copy of what they digitally signed. This can be accomplished by emailing the document to the signer after it has been signed, by printing a signed version of the document, saving a copy of the document's current stage to a disk, and the like. This enables each signer to compare the document that is ultimately recorded with the document as it existed when they signed it.

FIG. 3A illustrates a completed electronic document 310 that has multiple digital signatures. In this example, the content 301 refers to a legal transaction that is to be recorded in a county office, although the content is not limited to a legal transaction as previously described. Signature A 302 is the digital signature of a first signer, signature B 303 is the digital signature of a second signer, notary signature 304 is the digital signature of a notary public (if necessary), and recorder signature 305 is the digital signature of a recorder.

As shown by FIGS. 3A through 3E, the first signature embedded in the electronic document was signature A 302, which was followed by signature B 303, notary signature 304, and recorder signature 305, respectively. Before the recorder digitally signs the electronic document 300 and places the recorder signature 305 in the electronic document, the recorder will reconstruct the document to its previous stage or state, which is represented by FIG. 3B. Reconstructing the document allows the recorder to verify or validate the electronic document as well as one or more of the digital signatures.

FIG. 3B thus illustrates a document that has been reconstructed to the state it was in before the recorder signed it. In a similar manner, FIG. 3C represents the electronic document before it was signed by the notary. FIG. 3D represents the electronic document before it was signed by signer B and FIG. 3E represents the electronic document before it was signed by signer A.

Each signature block, including the notary signature block and the recorder signature block, has a reconstruct attribute that describes what level or state the electronic document was in when it was digitally signed. A county recorder, for example, needs to be assured that the same document was signed by the signer A, the signer B, and the notary public before the digital signature of the recorder can be embedded in the electronic document. In some instances, it may be necessary to reconstruct the document to more than one state or level for validation purposes.

An exemplary signature block is as follows:

```
<SignatureBlock reconstruct = "1">
    <Signature hashalgorithm = "MD5" datetime = "5/17/01
    1:56:33 PM" signername = "Jim Smith" signertitle = "Grantor"
    base64value = "eUWEy6Ln...+ HGIZkduvqc"/>
    <Certificate base64value = "axkE6...0kvB4oeBylCA"/>
</SignatureBlock>
```

The <SignatureBlock> element has, but is not limited to, a reconstruct attribute. The reconstruct attribute is used when the electronic document is reconstructed and is also used to determine the order in which the signers signed or executed the electronic document.

The above example of a signature block includes a <Signature> element and a <Certificate> element. The <Signature> element has attributes that include, but are not limited to, hashalgorithm, datetime, signername, signertitle, and base64value (also referred to herein as the signature attribute). The hashalgorithm attribute identifies a particular hash algorithm and the timedate attribute identifies when the electronic document was signed or executed by time and date. The signername attribute identifies the name of the person or entity signing the electronic document while the signertitle attribute identifies the title of the person or entity signing or executing the electronic document. The base64value attribute or signature attribute corresponds to the digital signature of the signer. The <Certificate> element includes, but is not limited to, a base64value attribute that corresponds to a digital certificate of the signer.

The information that is included in the <SignatureBlock> ensures that the electronic document has not changed since it was signed or executed by the previous signer and enables the electronic document to be reconstructed for validation purposes. Signing an electronic document necessarily changes the document and those that execute or sign the electronic document at a later time need assurance that the original document has not altered or has not been changed. This can be accomplished through the signature block.

When the recorder applies the recorder signature 305 to the electronic document as shown in FIG. 3A, some of the attributes in the recorder signature block are filled before the base64value attribute, which is the digital signature of the recorder, is generated. More specifically, the signername attribute, the datetime attribute, and the signertitle attribute are filled when the recorder digitally signs the electronic document. As a result, these attributes will be included in the hash of the electronic document that is encrypted by the private key of the recorder. Alternatively, these fields are not filled when the digital signature is generated and as a result, these field values are not included in the hash value generated from the electronic document. The distinction is relevant when the electronic document is reconstructed as it is necessary to remove information or data from the electronic document that was not included in the hash.

When an electronic document is verified or validated, it is first reconstructed using the reconstruct attribute and it is necessary to reconstruct the document to its previous state before it is validated or verified. Reconstructing a document is usually performed in memory with a copy of the electronic document and the original electronic document is not altered during reconstruction. The following example, with reference to FIGS. 3A and 3B, illustrates how the electronic document is reconstructed and how the recorder's signature is validated or verified. A similar process can be applied to validate and/or reconstruct other levels or stages of the electronic document. To reconstruct the document to the state it was in before the signature of the recorder was embedded in the electronic document, all information added by the recorder needs to be removed from the electronic document. This can be determined in part from the reconstruct attribute.

The reconstruct attribute of the signature block of the recorder is usually different (usually larger) that the reconstruct attributes of the other signature blocks. In this example, the endorsement data, and the base64value attribute in the recorder's signature block are stripped from the copy of the document in order to reconstruct the electronic document to a previous state. No data is stripped from the other signature blocks because they have a lower or different reconstruct attribute. After the document has been reconstructed in this manner, the resulting document can be hashed using the hashalgorithm that is identified in the signature block of the recorder. The digital signature of the recorder is decrypted using the public key of the recorder that is in the digital certificate included in the <certificate> tag of the signature block. Alternatively, the certificate could be implemented as an attribute of the <signature> element. If the hash of the reconstructed document matches the decrypted digital signature, then the electronic document and the recorder's signature are validated. In the case where the other attributes were added to the signature block after the digital signature of the recorder was generated, then these values will also be stripped from the document during reconstruction of the electronic document.

The signature of the notary, with reference to FIGS. 3B and 3C can be similarly validated and verified. Using the reconstruct attribute of the notary signature block, it is possible to strip out the relevant notary data such that the resulting document is reconstructed to its previous state. If the recorder has also digitally signed the document when the digital signature of the notary is being validated, it is necessary to strip out the data input by the recorder because of the value of the recorder's reconstruct attribute in order to reconstruct the document such that the signature of the notary public can be validated or verified. After the document has been reconstructed, the resulting electronic document is hashed and the hash value is compared to the decrypted digital signature of the notary. If the values match, then the document and the notary signature are validated.

In another case, it is possible for one or more signatures to have the same reconstruct attribute. The value of the reconstruct attribute can be equal to the reconstruct attribute of another signature when a signer does not want to incorporate the signature of another signer in their digital signature. In this case, reconstruction of the document requires that the affected data of both signers be stripped in order to reconstruct the document to its previous state.

More generally, reconstructing and verifying or validating an electronic document requires that that information be stripped from the electronic document. The information that is to be removed or stripped from the document can be identified from the reconstruct attribute. In the case of validating the signature of the recorder shown in FIG. 3A, reconstruction results in the electronic document 310 shown in FIG. 3B, where the recorder signature and endorsement data has been stripped or removed from the electronic document 300. In this manner, the signatures can be verified or validated.

Another example of a signature block or signature element is as follows:

<Signature SigID="1" Name="Joe J Recorder" certificate = "axxy6...0kvB4oeBylCA" hashAlg = "MD5" Signature = "axkE60...kvB4oeBylCA" "timestamp = "date time">==Joe J Recorder==</Signature>

In this example of a signature block or signature element, all of the associated data is in an attribute. Exemplary attributes include a signature identifier (SigID) a name attribute that stores the name of the signer, a certificate attribute that carries a digital certificate of the signer, a signature attribute that stores the digital signature of the signer, a timestamp attribute that identifies when the electronic document was digitally signed, and the name of the signer in text that results in the name of the signer being displayed where the digital signature is embedded.

When an electronic document is signed using this example, some of the attributes are populated or filled just before the digital signature of the signer is generated. Usually, all of the attributes are filled before the digital signature is generated. Thus the digital signature is related to all of the data in the electronic document except the digital signature of the signer. When the document is reconstructed, it is only necessary to remove the digital signature of the signer. In addition, each signature block or signature element is added to the document when the document is digitally signed. Thus, the signature block for the notary and/or the recorder are not yet present in the electronic document when signed by a primary signer. Alternatively, it is possible to have the signature blocks for the notary and/or the recorder in the document, but they are not yet populated because the notary and the recorder have not yet digitally signed the electronic document.

Reconstructing an electronic document in this case uses the identity of the signer. If the digital signature of the recorder is being validated or verified, it is only necessary to strip or remove the digital signature of the recorder in order to reconstruct the electronic document. If the digital signature of the notary is being reconstructed, it is necessary to remove or strip out the digital signature of the notary as well as the signature block or signature element of the recorder in order to reconstruct the electronic document to a previous state. This is possible because it is known that the recorder digitally signs the document after the notary. In a similar manner, it is clear that the notary digitally signs the electronic document after the primary signer. Thus, verification or validation of the primary signer requires the signature block or signature element of both the recorder and the notary to be removed from the electronic document during reconstruction. The digital signature of the primary signer is also removed during reconstruction of the document for verification of the primary signer. Thus, a reconstruct attribute is not necessary in this example and is therefore not included in this example of the signature block.

As each signer digitally signs the document, the name of the signer will appear in the electronic document because of the text portion of the signature block or signature element. In this example, the <SignatureDisplay> tag is not necessary.

Extensible Markup Language (XML) allows elements to be self defined and the present invention includes Electronic Recording Markup Language (ERML), which is an example of a collection of elements that can be used with electronic documents. XML (and ERML by extension) is primarily concerned with data and data structure and is not primarily concerned with data presentation. XHTML, however, provides a standard set of tags that is used to make data visually appealing. The present invention combines XML or ERML and XHTML to provide a portable data structure that is visually appealing. In other words, the XML or ERML described herein is part of a schema that has a Document Type Definition (DTD). The advantage of combining XML and XHTML is that a document is generated that is human or browser readable as well as machine readable. This enables electronic documents to be rendered on a computer such that they can be read by a person and understood by the computer. The combination of XML and/or ERML and XHTML preserves the monolithic nature of the electronic document such that a signer is signing the electronic document. This is different from other applications, where the signer is unsure of whether they are signing the style sheet than rendered an XML document or whether they are signing an XML document in good faith.

Figure 4:
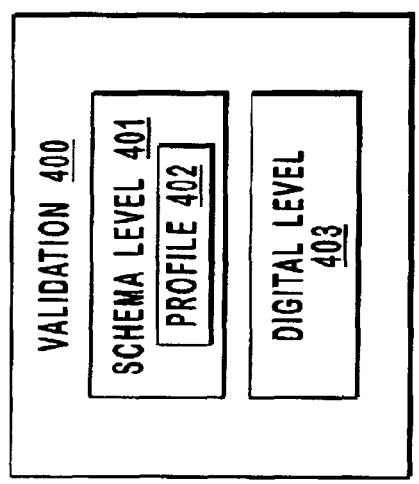
FIG. 4 is a block diagram illustrating multiple levels of validation for an electronic document.

FIG. 4 is a block diagram that illustrates a broad view of how an electronic document is validated or verified. Validation 400 occurs on at least two levels. The digital level 403 includes digital signatures and digital certificates as previously described. The schema level 401 is used to validate the format or structure of the electronic document. The XML or ERML schema should define every element and attribute within a particular document in order for that document to be valid. Each tag or element in an electronic document is checked to ensure that they conform with the specified schema and an electronic document is considered valid when it conforms to standards that are imposed by the relevant schema. A schema check thus ensures that the tags or elements included in the electronic document occur in their proper or defined order and that all of the required tags and elements are present. The content of each element or tag is also checked against the element data type defined by the schema.

A profile 402 is also associated with the schema level 401. In a profile check, the document is processed to determine if the electronic document has the elements, tags and attributes that are necessary for a particular purpose, such as recording a document. A profile check differs from a schema check in that the profile check does not check for correct data type content, but only checks for the existence of defined tags or elements and their attributes. The schema level 401 type of validation usually occurs before the digital level 403 validation. If an electronic document is invalid on its face, then it cannot be properly processed even if the digital signatures are valid and verifiable. Processing an electronic document with embedded digital signatures typically ceases whenever any level of validation fails.

The profile check, as well as the schema check, is often implemented before the electronic document is submitted for recordation as described with reference to FIG. 2A during the profile verification. The profile verification can identify those documents that are likely to fail such that they may be remedied before they are actually submitted for recordation. Thus, the profile and/or the schema check can be extended to include validation rules of various jurisdictions or counties such that a user can more efficiently cause their electronic documents to be recorded. The profile validation can also be used to verify the routing information that is included in either the electronic documents or in the package. For example, the validity of a destination URL may be determined.

Figure 5:
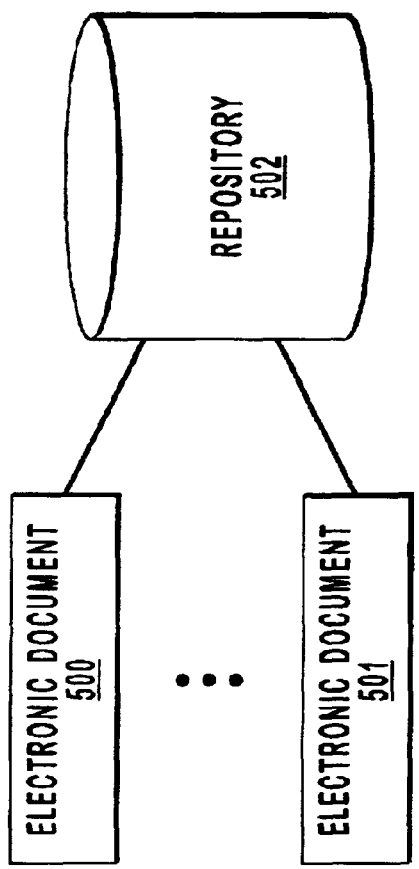
FIG. 5 is a block diagram illustrating how an electronic document may be stored in a database.

FIG. 5 is a block diagram that describes one example of how electronic documents are stored. Electronic documents (represented by electronic documents 500 and 501) can be stored as text in a file or as text files. In this example, however, the electronic documents 500 and 501 are stored in a database or repository 502, which provides several advantages. By storing the electronic documents in a repository or a database, they are protected from alteration or deletion while they are stored. Encryption can also be utilized for privacy and protection. In addition, storing the electronic documents in a database facilitates searching. Searching is further facilitated because the electronic documents described herein are delimited by XML elements. The electronic documents can be sorted, filtered, searched and the like.

Figure 6:
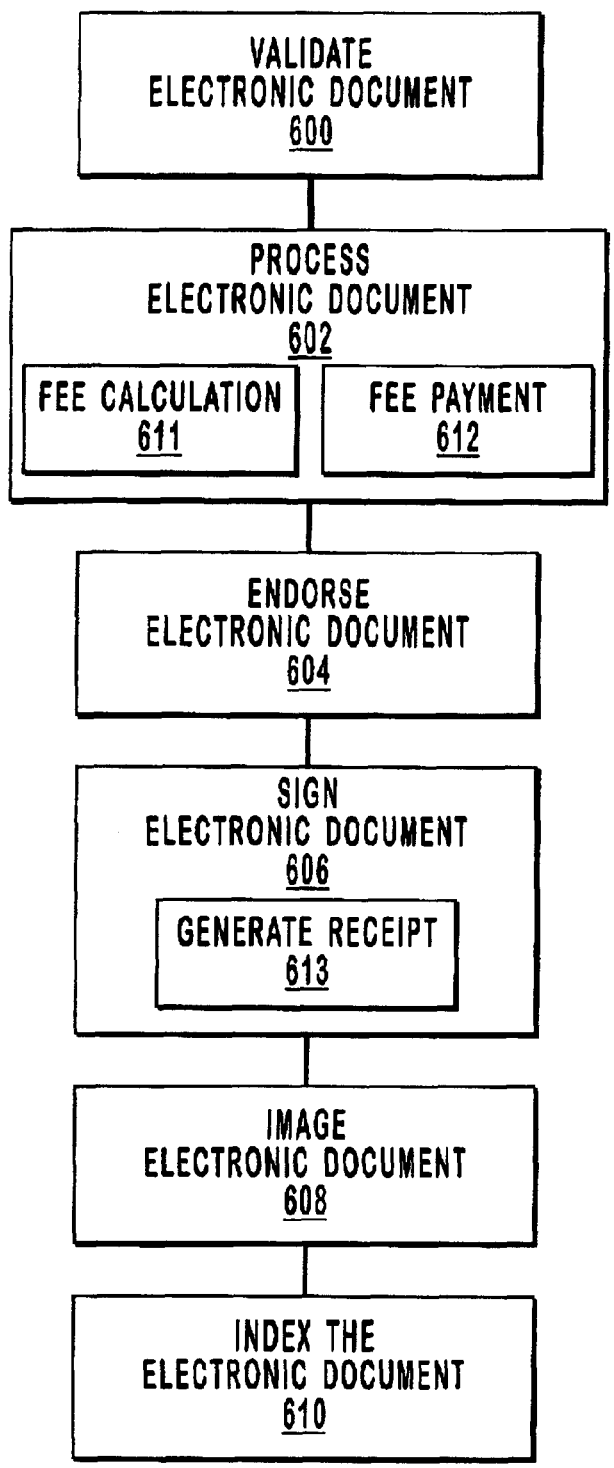
FIG. 6 is a block diagram illustrating how an electronic document is processed when it is recorded.

FIG. 6 is a block diagram that illustrates how an electronic document is processed. FIG. 6 illustrates a case where the electronic document needs to be recorded. Thus, FIG. 6 more specifically illustrates how an electronic document is recorded. When the electronic document is received, it is validated (600). The validation or verification of the electronic document can be performed on different levels and different aspects of the electronic document. The electronic document is often checked to insure that it has a valid format (xHTML). A profile and/or schema check may also be performed as previously described. Because the electronic document can be embodied in different types, a check is made to ensure that the electronic document is of a type that is accepted by the document processor or recorder.

In some instances a package or group of multiple electronic documents is received for processing or recordation. In this instance, the package is also checked to insure, for example, that the routing information is properly identified in the package. In this case, the routing information is not included in the electronic documents, but is included in the package. The package may be checked to insure that is has a proper structure, format, and/or data type. In other words, a profile and/or schema check can also be applied to the package as well as the electronic documents.

The validity of the data contained in the electronic document is checked for validity. For example, the data is checked to insure that it is within proper ranges or has the proper data type. In some instances, the electronic document is required to have certain tags, and the document is checked to determine if these tags are present. Finally, the notary signature and/or other signatures are validated as previously described, which often involves reconstructing the document to a previous state as previously described.

Next, the electronic document is processed (602). In this example, the number of pages in the electronic document is determined. This can be accomplished by imaging the electronic document for the purpose of counting the number of pages. The appropriate fee is then computed (611), based on both the document and/or the number of pages. When feasible, funds are transferred to pay the fee (612). Account information is often included in the routing information of the electronic document.

After the fee has been paid, the electronic document is endorsed (604). This includes the act of inserting the endorsement data into the empty endorsement fields of the electronic document that are already present. The endorsement data may include, for example, the book, page, and entry number of the recorded document, the cost of recording the electronic document, a timestamp, the count and state of recordation, the name of the county official, and the county official's digital signature. The endorsement is applied to the electronic document in this manner.

After the endorsement data is applied or inserted in the document, the electronic document is digitally signed by the recorder (606) as previously described. Next, a receipt is generated (613) that reflects the recordation of the electronic document. Then, the electronic document is imaged (608) again for archival purposes.

The electronic document is then indexed. Because electronic document is an XML (or ERML) document and thus machine readable, the data from the elements can be extracted and stored or indexed. The indexed documents can be searched more easily and the further validation can be performed on the recorded data if necessary.

As previously described, each electronic document may have routing information or the routing information may be in the package. The routing information, in addition to identifying who sent the electronic document and where the electronic document originated from, may contain other pertinent information including, but not limited to, account information, order number a document identifier, a URL, and the like. The routing information also has other purposes. For example, the routing information permits error documents and receipts, for example, to be associated with the appropriate order or electronic document. Recorded documents can be returned to the sending server or user.

Often, electronic documents are not sent one at a time but in groups. Electronic documents sent one at a time or in groups are usually sent in a package. The package often includes the routing information such that the electronic document does not require the routing information as previously described. The present invention provides XML or ERML elements for the package that permit the separate documents to be easily recognized and processed. The actions taken during processing a group of electronic documents, however, can vary. For example, if one of the documents is not validated, then the entire group may be rejected and not processed or recorded. Alternatively, only the electronic document that was not validated may be rejected and not recorded. In some instances, the XML can include processing messages that define how to handle an electronic document that is not validated.

County recorders and other entities are often required to record documents sequentially. This creates a problem because not all documents recorded by a county recorder are electronic documents. Some of them are paper documents. In one example, the numbering system, which may include entry, book and page numbers are shared by paper workstations and the present invention is able to accommodate these paper workstations such that the requirement of maintaining sequential numbers is satisfied. In some instances, an internal number may be used to identify an electronic number until an actual number is assigned. The present invention may maintain a database that is accessible by the systems and methods described herein as well as by an existing systems such that the appropriate numbers (entry, book, page, for example) can be assigned sequentially.

For the electronic documents, an audit log is maintained. Each audit log is typically machine readable, human readable, unalterable, legally verifiable, and digitally signed. An audit log usually includes the following information: a sequence number, a timestamp, a document identifier, a document description, a governing process, a description of operation, a duration, and additional information as needed. The audit logs are usually digitally signed with the recorder's digital signature. Audit logs thus contain information that relates to the transfer of information between one or more persons or entities and will record the interaction as well as the information that was transferred.

Generally, audit logs serve to record the various processes performed with respect to electronic documents as a result of operations specified by a transport software that manages the communication between the origination server and the destination server as well as record actions that are performed by the recorder. A client audit log will record actions taken by a user. Thus, audit logs enable ready reconstruction of the history of processes and operations performed by the servers with respect to a particular electronic document. In addition to audit logs, at least some embodiments of the present invention include various tables for retrievably storing routing, account, and other information.

After an electronic document has been recorded, a digitally signed electronic receipt is generated and returned to one or more designated persons in addition to an endorsed certified copy of the original electronic document. The digitally signed receipt usually includes: a book, page and entry number of the recorded electronic document, the cost or recording, a time stamp for the recording of the electronic document, the county and state in which the electronic document was recorded, name of the recorder, name of the county official, and the digital signature of the county official.

When an error occurs, a digitally signed electronic rejection and error notice is returned to the designated users in addition to the electronic document. The electronic rejection includes: book, page, and entry number of the recorded document, the cost of reviewing the electronic document, the date and time of reviewing, the county and state of reviewing, the name of the person that reviewed the electronic document, although it is possible for a machine to reject the electronic document, the name of the county official, the digital signature of the county official, the reason for rejection, and a list of errors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system that receives an electronic document that has digital signatures that are embedded in the electronic document, a method for recording the electronic document, the method comprising steps for:

reconstructing the electronic document by removing information identified by one or more reconstruct attributes, wherein each of the one or more reconstruct attributes corresponds with one or more of the digital signatures;

validating the electronic document by verifying at least one of the embedded digital signatures;

determining a number of pages in the electronic document to determine a fee;

endorsing the electronic document by inserting endorsement data in an endorsement portion of the electronic document;

embedding a digital signature of a recorder in a recorder signature block, wherein the recorder signature block is added to the electronic document if the recorder signature block is not already present;

generating a receipt for recordation of the electronic document, wherein the digital signature of the recorder is embedded in the receipt;

imaging the electronic document; and indexing the electronic document.

2. A method as defined in claim 1, wherein the step for validating the electronic document by verifying at least one of the embedded digital signatures comprises the act of verifying an embedded digital signature of a notary public.

3. A method as defined in claim 1, wherein the step for validating the electronic document by verifying in at least one of the embedded digital signatures comprises acts of:

identifying an embedded digital signature to verify, wherein the embedded digital signature has a reconstruct attribute;

removing information from the electronic document that was added to the document after the electronic document was digitally signed with the embedded digital signature, wherein the information to be removed is identified using the reconstruct attribute;

using a hash identified by the embedded digital signature, hashing the reconstructed electronic document to produce a hash result;

decrypting the embedded digital signature; and validating the embedded digital signature if the hash result matches the decrypted embedded digital signature.

4. A method as defined in claim 1, wherein the step for validating the electronic document by verifying at least one of the embedded digital signatures comprises the acts of:

identifying an embedded digital signature to verify;

removing signature blocks for digital signatures that occurred after the embedded digital signature; and removing the embedded digital signature from its signature block.

5. A method as defined in claim 1, wherein the step for validating the electronic document further comprises at least one of the acts of:

performing a schema check on the electronic document; and performing a profile check on the electronic document.

6. A method as defined in claim 1, wherein the step for determining a number of pages further comprise an act of imaging the electronic document for the purpose of determining the number of pages.

7. A method as defined in claim 1, wherein the step for determining a number of pages further comprises acts of:

determining a fee for recording the electronic document; and transferring funds for the fee, wherein account information is identified in the electronic document or in a package.

8. A method as defined in claim 1, wherein the endorsement data comprises one or more of: a book number; a page number; an entry number, a cost of recording; a data of recording; a time of recording; a count of recording; a state of recording; a recorder name; an official name; and a digital signature of the official.

9. A method as defined in claim 1, wherein the act of embedding a digital signature of the recorder further comprises acts of:
inserting a timestamp in a signature block of the recorder;
generating a digital signature by hashing the recorded electronic document and encrypting a hash result with a private key of the recorder; and
inserting the digital signature of the recorder in the signature block of the recorder.

10. A method as defined in claim 1, wherein the step for generating a receipt for recordation of the electronic document further comprises an act of inserting the endorsement data in the receipt before the receipt is digitally signed by the recorder.

11. A computer program product having computer executable instructions for performing the steps recited in claim 1.

12. In a system that receives electronic documents, a method for verifying an electronic document that has one or more embedded digital signatures, the method comprising acts of:
identifying a reconstruct attribute for each of the one or more embedded signatures, wherein each of the one or more embedded signatures is in a signature block;
selecting a particular embedded signature to verify, wherein the reconstruct attribute of the particular embedded signature is compared to the other reconstruct attributes;
removing attribute data for those signature blocks whose reconstruct attribute indicates were added subsequently to the particular reconstruct attribute of the particular embedded signature during reconstruction of the electronic document;
removing the particular embedded signature from a corresponding signature block such that the electronic document is reconstructed; and
verifying the particular embedded signature and the electronic document if a hash of the reconstructed electronic document matches a decrypted value of the particular embedded signature.

13. A method as defined in claim 12, wherein the particular embedded signature is a notary signature.

14. A method as defined in claim 12, wherein the act of removing attribute data further comprises an act of removing attribute data from those signature blocks whose reconstruct attribute is equal to the particular reconstruct attribute of the particular embedded signature.

15. A method as defined in claim 12, further comprising an act of performing a schema check on the electronic document.

16. A method as defined in claim 12, further comprising an act of performing a profile check on the electronic document.

17. A computer program product having computer executable instructions for performing the acts recited in claim 12.

18. In a system that uses electronic documents for generating and recording transactions, a signature module for embedding digital signatures in the electronic documents, the signature module comprising:
a signature block, wherein the signature block has at least one reconstruct attribute that may be used to identify information that can be removed to reconstruct and verify an electronic document, said at least one reconstruct attribute comprising:
a digital signature attribute that contains a digital signature of a user;
a hash attribute that identifies a hash used to hash the electronic document;
a timestamp attribute that is filled just before the digital signature of the user is generated such that the hash represented in the digital signature includes at least the timestamp;
a signer attribute that identifies the user;
a signer title attribute that identifies a title of the user; and
a certificate attribute that contains a digital signature of a certificate authority for use in decrypting the digital signature of the user.

19. A signature module as defined in claim 18, wherein the signature block is included in the electronic document when the electronic document is generated, wherein at least some of the attributes are filled when the electronic document is generated.

20. A signature module as defined in claim 18, wherein the signature block is added to the electronic document when the electronic document is digitally signed.

21. A signature module as defined in claim 20, wherein all attributes except the digital signature attribute are filled before the digital signature of the user is generated such that the digital signature of the user is related to the filled attributes, wherein only the digital signature attribute is removed during reconstruction of the electronic document.

22. In a system that records documents, a method for recording electronic documents with embedded digital signatures, the method comprising acts of:
receiving an electronic document from an originating server;
performing a schema check and a profile check on the electronic document, wherein a failure notice is returned to the originating server if either the schema check or the profile check fails, wherein the electronic document is not recorded in the case of a failure;
validating the electronic document by performing acts of:
reconstructing the electronic document to a previous state by removing information from the electronic document, the removed information being identified by one or more reconstruct attributes corresponding with other embedded digital signatures;
hashing the reconstructed electronic document to produce a hash; and
comparing the hash with a decrypted value of the embedded digital signature such that the electronic document is validated if the hash matches the decrypted value;
recording the electronic document by a recorder by inserting endorsement data; and
digitally signing the electronic document by the recorder in a recorder signature block.

23. A method as defined in claim 22, wherein the act of performing a schema check and a profile check further comprises acts of:
ensuring that the electronic document has necessary tags for a type of electronic document;
ensuring that attributes of the necessary tags are present in the electronic document; and
ensuring that data types of the attributes are correct.

24. A method as defined in claim 22, the act of validating the electronic document further comprises an act of repeating the acts of claim 21 for each electronic document in a group of electronic documents.

25. A method as defined in claim 24, wherein the group of electronic documents is failed if one of the electronic documents in the group of electronic documents fails the schema check, the profile check, or the validation.

26. A method as defined in claim 24, wherein the group of electronic documents is not failed if one of the electronic documents in the group of electronic documents fails the schema check, the profile check, or the validation.

27. A method as defined in claim 22, wherein the act of digitally signing the electronic document by the recorder further comprises an act of adding the recorder signature block to the electronic document and an act of filling attributes of the recorder signature block before the digital signature of the recorder is generated.

28. A computer program product having computer executable instructions for performing the acts recited in claim 22.

29. In a system that receives electronic documents, a method for verifying an electronic document that has one or more embedded digital signatures, the method comprising acts of:

selecting a particular embedded signature to verify, wherein the particular embedded signature is in a particular signature block that can be identified by a reconstruct attribute;

reconstructing the electronic document to a previous state by, based on information identified by one or more other reconstruct attributes, removing other signature blocks that were added to the electronic document after the particular embedded signature was generated, and removing the embedded signature from the particular signature block; and verifying the particular embedded signature and the electronic document if a hash of the reconstructed electronic document matches a decrypted value of the particular embedded signature.

30. A method as defined in claim 29, wherein the particular embedded signature is a notary signature.

31. A method as defined in claim 29, wherein the act of removing signature blocks further comprises an act of identifying those signature blocks that were added to the electronic document after the particular signature block.

32. A method as defined in claim 29, further comprising an act of performing a schema check on the electronic document before the act of selecting a particular embedded signature to verify.

33. A method as defined in claim 32, further comprising an act of performing a profile check on the electronic document.

34. A computer program product having computer executable instructions for performing the acts recited in claim 29.

* * * * *

UNITED STATES PATENT AND TRADEMARK OFFICE
CERTIFICATE OF CORRECTION

PATENT NO. : 6,796,489 B2
DATED : September 28, 2004
INVENTOR(S) : Calvin N. Slater et al.

It is certified that error appears in the above-identified patent and that said Letters Patent is hereby corrected as shown below:

Title page,
Item [56], References Cited, U.S. PATENT DOCUMENTS, insert

| | | | |
|---|---|---|---|
| -- 4,302,810 | 11/1981 | Bouricius, et al. | 364/200 |
| 4,423,287 | 12/1983 | Zeidler | 178/22.08 |
| 4,823,264 | 4/1989 | Deming | 364/408 |
| 5,187,351 | 2/1993 | Clary | 235/379 |
| 5,191,613 | 3/1993 | Graziano, et al. | 380/25 |
| 5,218,637 | 6/1993 | Angebaud, et al. | 380/23 |
| 5,224,162 | 6/1993 | Okamoto, et al. | 380/24 |
| 5,283,829 | 2/1994 | Anderson | 380/24 |
| 5,297,202 | 3/1994 | Kapp, et al. | 380/9 |
| 5,321,751 | 6/1994 | Ray, et al. | 380/23 |
| 5,326,959 | 7/1994 | Perazza | 235/379 |
| 5,343,530 | 8/1994 | Viricel | 380/23 |
| 5,465,299 | 11/1995 | Matsumoto, et al. | 380/23 |
| 5,473,690 | 12/1995 | Grimonprez, et al. | 380/24 |
| 5,504,818 | 4/1996 | Okano | 380/49 |
| 5,521,980 | 5/1996 | Brands | 380/30 |
| 5,530,755 | 6/1996 | Pailles, et al. | 380/18 |
| 5,532,920 | 7/1996 | Hartrick, et al. | 364/419.1 |
| 5,557,722 | 9/1996 | DeRose, et al. | 395/148 |
| 5,615,268 | 9/1997 | Bisbee, et al. | 380/25 |
| 5,671,282 | 9/1997 | Wolff, et al. | 380/25 |
| 5,673,316 | 9/1997 | Auerbach, et al. | 380/4 |
| 5,673,320 | 9/1997 | Ray, et al. | 380/25 |
| 5,677,955 | 10/1997 | Doggett, et al. | 380/24 |
| 5,708,806 | 1/1998 | DeRose, et al. | 395/235 |
| 5,724,523 | 3/1998 | Longfield | 395/235 |
| 5,748,738 | 5/1998 | Bisbee, et al. | 380/25 |
| 5,812,669 | 9/1998 | Jenkins, et al. | 380/25 |
| 5,850,442 | 12/1998 | Muftic | 380/21 |
| 5,864,828 | 1/1999 | Atkins | 705/36 |
| 5,905,800 | 5/1999 | Moskowitz, et al. | 380/28 |
| 5,943,423 | 8/1999 | Muftic | 380/25 |
| 5,956,404 | 9/1999 | Scheier, et al. | 380/25 |
| 6,016,484 | 1/2000 | Williams, et al. | 705/39 |
| 6,021,202 | 2/2000 | Anderson, et al. | 380/25 |
| 6,032,137 | 2/2000 | Ballard | 705/75 |
| 6,131,162 | 10/2000 | Yoshiura, et al. | 713/176 |
| 6,185,683 | 2/2001 | Ginter, et al. | 713/176 |
| 6,219,423 | 4/2001 | Davis | 380/268 -- |

UNITED STATES PATENT AND TRADEMARK OFFICE
CERTIFICATE OF CORRECTION

PATENT NO. : 6,796,489 B2
DATED : September 28, 2004
INVENTOR(S) : Calvin N. Slater et al.

It is certified that error appears in the above-identified patent and that said Letters Patent is hereby corrected as shown below:

Title page (cont'd),
FOREIGN PATENT DOCUMENTS, insert
-- PCP        WO 96/31965        10/1996
  EP           EP 0542298        5/1993 --.

Column 18,
Line 28, after "verifying" remove "in".

Signed and Sealed this

Twenty-first Day of February, 2006

JON W. DUDAS
*Director of the United States Patent and Trademark Office*